(12) United States Patent
Zhang et al.

(10) Patent No.: US 9,004,709 B2
(45) Date of Patent: Apr. 14, 2015

(54) ANTI-ABRASION OPTICAL DIFFUSION FILM, LCD DEVICE AND LIGHTING DEVICE (75) Inventors: Yan Zhang, Ningbo (CN); Yadong Jin, Ningbo (CN)

(73) Assignee: Ningbo Exciton Technology Co., Ltd., Ningbo, Zhejiang (CN)

( * ) Notice: Subject to any disclaimer, the term of this patent is extended or adjusted under 35 U.S.C. 154(b) by 157 days.

(21) Appl. No.: 13/578,794

(22) PCT Filed: Jan. 14, 2011

(86) PCT No.: PCT/CN2011/070276
§ 371 (c)(1),
(2), (4) Date: Mar. 21, 2013

(87) PCT Pub. No.: WO2012/027973
PCT Pub. Date: Mar. 8, 2012

(65) Prior Publication Data
US 2013/0201662 A1 Aug. 8, 2013

(30) Foreign Application Priority Data
Aug. 31, 2010 (CN) .......................... 2010 1 0271969

(51) Int. Cl.
*G09F 13/04* (2006.01)
*G02B 5/02* (2006.01)
*G02B 1/10* (2006.01)
*G02F 1/1335* (2006.01)

(52) U.S. Cl.
CPC *G02B 5/02* (2013.01); *G02B 1/105* (2013.01); *G02B 5/0226* (2013.01); *G02F 1/133504* (2013.01); *G02F 1/133606* (2013.01); *G02F 2201/50* (2013.01)

(58) Field of Classification Search
USPC .................. 362/97.2, 97.1; 359/599
See application file for complete search history.

(56) References Cited

U.S. PATENT DOCUMENTS 7,072,115 B2 * 7/2006 Uekita et al. .................. 359/599
7,632,000 B2 * 12/2009 Han et al. ...................... 362/561
(Continued)

FOREIGN PATENT DOCUMENTS

| CN | 101339261 A | 1/2009 |
| CN | 101370655 A | 2/2009 |

(Continued)

OTHER PUBLICATIONS

The Notification of First Examiner's Opinion issued by the SIPO on May 25, 2011.
International Search Report in international application No. PCT/CN2011/070276, mailed Jun. 9, 2011.

*Primary Examiner* — Evan Dzierzynski
(74) *Attorney, Agent, or Firm* — Weisun Pao; Greenberg Traurig LLP (57) ABSTRACT

An anti-abrasion optical diffusion film (2), an LCD device and a light source using the anti-abrasion optical diffusion film (2) are disclosed, in order to solve the problem of the prior art that the diffusion particles are abraded or detached in large area, when an optical diffusion thin film receives external force. The anti-abrasion optical diffusion film (2) includes a substrate (21) and a diffusion coating (22); the diffusion coating (22) includes diffusion adhesive layer (24) and diffusion particles (23). The variation coefficient of the diameter of the particles is 10-100%. The invention improves the anti-abrasion ability of the optical diffusion thin film.

14 Claims, 2 Drawing Sheets

(56) References Cited

U.S. PATENT DOCUMENTS

| | | |
|---|---|---|
| 2004/0197750 A1 | 10/2004 | Donaher et al. |
| 2007/0184260 A1* | 8/2007 | Saito et al. .................... 428/323 |
| 2007/0195431 A1* | 8/2007 | Asakura et al. ............... 359/707 |
| 2008/0002256 A1* | 1/2008 | Sasagawa et al. ............. 359/485 |
| 2009/0009872 A1 | 1/2009 | Toshima |
| 2010/0265739 A1 | 10/2010 | Funabashi et al. |

FOREIGN PATENT DOCUMENTS

| | | |
|---|---|---|
| CN | 101329416 B | 8/2010 |
| CN | 101881846 A | 11/2010 |
| TW | 200946969 A1 | 11/2009 |

* cited by examiner

ANTI-ABRASION OPTICAL DIFFUSION FILM, LCD DEVICE AND LIGHTING DEVICE

FIELD OF THE INVENTION

The present invention relates to an optical thin film, particularly relates to an anti-abrasion optical diffusion film, a LCD device and a lighting device using the anti-abrasion optical diffusion film.

BACKGROUND OF THE INVENTION

Optical diffusion film is widely applied to light source-required devices such as LCD devices, advertising light boxes, lighting devices and mobile communication apparatus keys to provide uniform illumination.

In recent years, LCD (liquid crystal display) device grows apace and is widely applied in the display device of the mobile communication apparatus, notebook computer, desktop computer and large-sized liquid crystal television. In addition, the optical diffusion film has increscent use in lighting device, which increases the requirement of the optical diffusion film for using in the LCD device and lighting device. The present study on the optical diffusion film is mainly concentrated on improving brightness.

However, in addition to the requirement for high brightness, the optical diffusion film needs good anti-abrasion property during the using process so as to prevent from abrasion or scratch. Specifically speaking, an optical diffusion film needs to be cut into a device-required size in advance during the using process, while a majority of the optical diffusion films can be subject to friction of conveyor belt during the cutting process in die cutting plant; the optical diffusion film after cutting is subject to abrasion by hands of operator during the packaging process; furthermore, friction between optical diffusion films tends to occur during the transportation process. Such various kinds of frictions can lead to damage of film appearance, which results in that the qualified percent of the films at client decrease. Additionally, the optical diffusion film in the lighting device is located outside the lamp, such that the film tends to be abraded or scratched during the cleaning process, which affects its use.

With respect to the above problems, the prior art improves the anti-abrasion property of the optical diffusion film primarily by increasing the strength of the resin binder, i.e., using resin reinforcing agent, in composition in the diffusion coating of the films, E.g., a patent application with publication No. CN101487902A discloses a novel environment-friendly anti-scraping prism film, using resin reinforcing agent to improve the anti-abrasion property of the film; and a patent application with publication No. CN2004461A "Anti-abrasion film and LCD", a patent with publication No. CN100498460C "Anti-abrasion optical film and use thereof", and a patent with publication No. CN100426008C "Anti-abrasion optical film and use thereof", all adopt heating-and-UV curing process and concave-convex structure, substantially enhancing the strength of the resin, to improve the anti-abrasion property of the thin film.

However, the diffusion coating of the optical diffusion film contains diffusion particles, a large majority of which is exposed out of the diffusion coating; accordingly, the binding strength between the resin and the particles cannot be guaranteed if the strength of the resin is independently improved, such that the diffusion particles in the diffusion coating tend to be detached or abraded during the service process of the film, which affects the use of the optical diffusion film.

In the prior art, diffusion particles of single diameter or of narrow disperse diameter are mostly used in diffusion coating of the optical diffusion film, and tend to be abraded or detached in large area when the film receives external force such as friction or abrasion, resulting in large-area abrasion of the optical diffusion film.

It is therefore desirable to further improve the anti-abrasion property of the optical diffusion film, and to reduce the large-area abrasion or shedding of the diffusion particles when the optical diffusion film receives external force.

BRIEF SUMMARY OF THE INVENTION

In view of the above description, the present invention provides an anti-abrasion optical diffusion film, an LCD device and a lighting device using the anti-abrasion optical diffusion film, the present invention is capable of reducing the large-area abrasion or shedding of the diffusion particles when the optical diffusion film receives external force, so as to improve the anti-abrasion property of the optical diffusion film.

Therefore, the present invention provides an anti-abrasion optical diffusion film, including a substrate and a diffusion coating. The diffusion coating includes a diffusion adhesive layer and diffusion particles, and the variation coefficient of the diameter of the diffusion particles is 10%-100%

Further, the anti-abrasion optical diffusion film as mentioned above, wherein the variation coefficient of the diameter of the diffusion particles is 15%-60%.

Further, the anti-abrasion optical diffusion film as mentioned above, wherein the variation coefficient of the diameter of the diffusion particles is 40%.

Further, the anti-abrasion optical diffusion film as mentioned above, wherein the diffusion particles are protruded out of the surface of the diffusion adhesive layer.

Further, the anti-abrasion optical diffusion film as mentioned above, wherein the diffusion particles are selected from the group of silicon compounds, silicone resin, polystyrene (PS), polymethyl methacrylate (PMMA), or the mixture of at least two thereof.

Further, the anti-abrasion optical diffusion film as mentioned above, wherein the diameter of the diffusion particles is 1-100 um.

Further, the anti-abrasion optical diffusion film as mentioned above, wherein the substrate can be polyethylene terephthalate (PET), glass, polycarbonate (PC), polymethyl methacrylate (PMMA) or polystyrene (PS).

The invention also provides an LCD device, including a backlight module and a liquid crystal panel. The backlight module includes at least one of the anti-abrasion optical diffusion films as mentioned above.

The invention also provides a lighting device including at least one of the anti-abrasion optical diffusion films mentioned above.

Compared with the prior art, the present invention uses particles having diameter with variation coefficient of 10%-100% as diffusion particles of the optical diffusion film, such that when the film receives external force such as friction or abrasion, only a very small fraction of diffusion particles which have some diameter range in the diffusion coating can be abraded or detached owing to the wide particle diameter distribution of the total diffusion particles, while the other diffusion particles can be free of influence, thereby reducing the abraded area of the optical diffusion film, solving the problem existing in the prior art that diffusion particles can be abraded or detached in large area when the optical diffusion film containing diffusion particles of single diameter or narrow diffusion diameter receives external force, and accordingly, improving the anti-abrasion property of the optical diffusion film.

BRIEF DESCRIPTION TO REFERENCE SIGN OF THE DRAWINGS 1, 2 optical diffusion film
11, 21 substrate
12, 22 diffusion coating
13, 23 diffusion particles
14, 24 diffusion adhesive layer
F external force

DETAILED DESCRIPTION OF THE INVENTION

The anti-abrasion optical diffusion film in the present invention comprises a substrate and a diffusion coating, wherein the diffusion coating includes a diffusion adhesive layer and diffusion particles; the variation coefficient of the diameter of the diffusion particles is 10%-100%, preferably 15%-60%, and more preferably 40%.

The anti-abrasion optical diffusion film in the present invention can also be referred to as the anti-abrasion optical diffusion thin film.

the variation coefficient (C.V value) of the diameter of the diffusion particles in the present invention is calculated according to the formula C.V=SD/X×100%, where SD is the distributive standard deviation of diameters of the diffusion particles, X is the mean diameter of the diffusion particles, and SD and X are calculated according to the following formulae, $$SD = \sqrt{(X_1 - X)^2 + (X_2 - X)^2 \ldots + (X_n - X)^2}$$

$$X = \frac{X_1 + X_2 + \ldots + X_n}{n}$$

wherein $X_1, X_2 \ldots X_n$ are diameter of the diffusion particles, and n is the number of the diffusion particles.

since the invention adopts particles with diameter variation coefficient of 10%-100% as diffusion particles, the diameter of the diffusion particles can be endowed with wide distribution, such that when the diffusion film receives external force, such as friction or abrasion, the diffusion particles can be prevented from large-area abrasion or shedding, which improves the anti-abrasion property of the optical diffusion film.

In the optical diffusion film of the present invention, the diffusion particles are mostly protruded out of the surface of the diffusion adhesive layer; and the diffusion particles with diameter variation coefficient of 10%-100% in the invention can also be used in optical diffusion film whose diffusion particles are located inside the diffusion adhesive layer.

The invention also provides an LCD device using the above anti-abrasion optical diffusion film. The LCD device comprises a backlight module and a liquid crystal panel. The backlight module comprises a liquid crystal panel, a light source, a light guide plate, an optical reflection film and an optical diffusion film, wherein 1-3 of the above anti-abrasion optical diffusion films can be applied as required, and the light source can be at least one of cold cathode fluorescent lamp, external electrode fluorescent lamp, light emitting diode and hot-cathode fluorescent lamp.

The anti-abrasion optical diffusion film in the invention can also be used in lighting device. The lighting device comprises at least one anti-abrasion optical diffusion films in the present invention.

The optical diffusion film in this invention is explained below with reference to the enclosed drawings.

Figure 1:
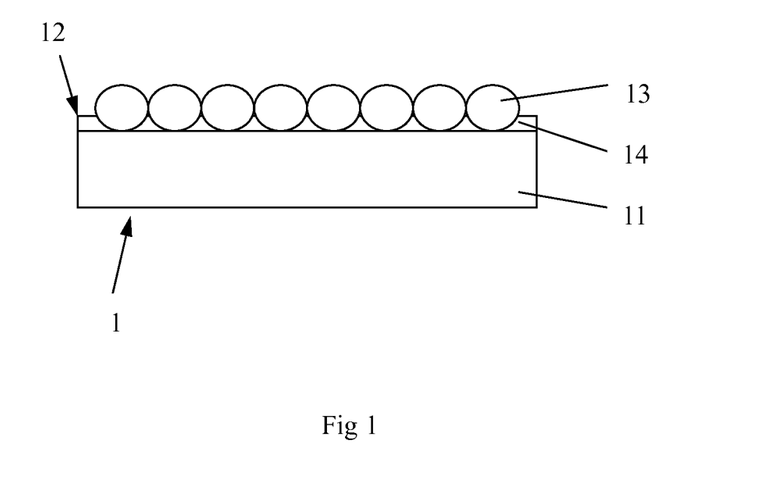
FIG. 1 is a schematic view of the section of the optical diffusion film of the prior art.
Figure 2:
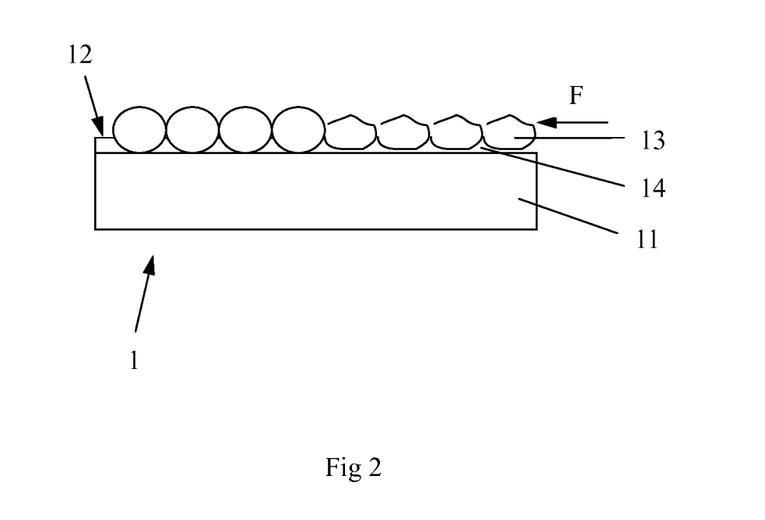
FIG. 2 is a schematic view of the section of the post-abrasion optical diffusion film of the prior art.

FIG. 1 is sectional view of optical diffusion film of the prior art, wherein the optical diffusion film 1 comprises a substrate 11 and a diffusion coating 12, the diffusion coating 12 includes diffusion particles 13 and a diffusion adhesive layer 14, and the diffusion particles 13 have equal diameter and are protruded out of the surface of the diffusion adhesive layer 14. FIG. 2 shows the abraded condition of the optical diffusion film 1 under external force F. As showed in the FIG. 2, when the optical diffusion film of the prior art receives external force F, the diffusion particles 13 are abraded first under action of the external force F, and are abraded in large area due to single particle diameter distribution to lead to large-area abrasion of the optical diffusion film.

Figure 3:
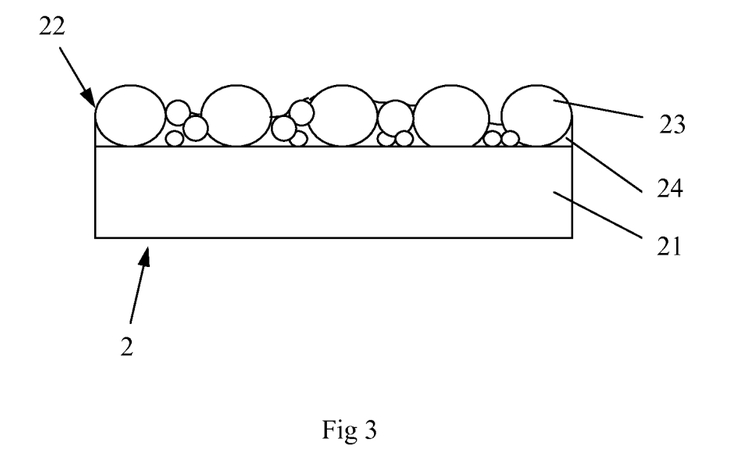
FIG. 3 is a schematic view of the section of the optical diffusion film of the present invention.
Figure 4:
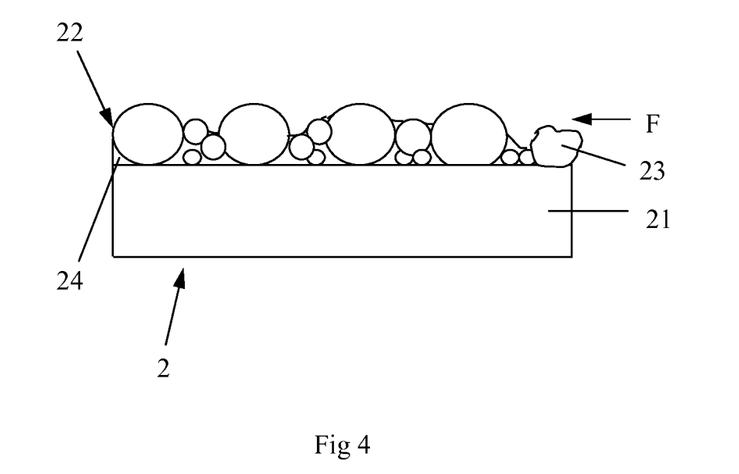
FIG. 4 is a schematic view of the section of the abraded optical diffusion film of the present invention.

FIG. 3 is sectional view of the optical diffusion film of the present invention. FIG. 4 is sectional view of the optical diffusion film of the present invention after abrasion. As showed in FIG. 3, the optical diffusion film 2 of the present invention comprises a substrate 21 and a diffusion coating 22, wherein the diffusion coating 22 comprises diffusion particles 23 and a diffusion adhesive layer 24, the variation coefficient of the diameter of the diffusion particles is 20%, and the diffusion particles are protruded out of the surface of the diffusion adhesive layer. As showed in FIG. 4, when the optical diffusion film 2 of the present invention receives external force F, a minority of the diffusion particles 23 of large diameter are abraded, while the other ones are free from influence owing to wide particle diameter distribution of the diffusion particles 23, thereby effectively avoiding large-area abrasion of the optical diffusion film 2.

Hereafter is the detailed embodiment of the anti-abrasion optical diffusion film of the present invention.

I. Preparation of the Optical Diffusion Film

Example 1

Preparation of the Optical Diffusion Film 1

Adding 36.5 weight parts of silicon dioxide particles (which are commercially available) with diameter of 1-100 um and particle diameter C.V value of 10% (mean particle diameter being 60 um and standard deviation being 6 um) into a container, then adding 40 weight parts of polyester polyol (PC5000, Guangzhou Libang Paint Ltd.), and then adding 4 weight parts of curing agent (PC2000, Guangzhou Libang Paint Ltd.) step by step, and then placing the container on a stirrer for stirring and mixing to obtain diffusion coating composition 1 of the present invention;

Coating the composition 1 to a PET substrate of 38 um (Shandong Fuwei Film Ltd.) to get the optical diffusion film 1 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel is 1-10 min (minute), and finally, winding through a winding machine (full automatic film winding machine manufactured by Guangdong Shicheng Plastic Machinery Ltd.).

Example 2

Preparation of the Optical Diffusion Film 2

Adding 36.5 weight parts of silicone resin particles (which are commercially available) with diameter of 1-100 um and particle diameter C.V value of 15% (mean particle diameter being 55 um and standard deviation being 8.25 um) into a container, then adding 40 weight parts of polyester polyol (PC5000, Guangzhou Libang Paint Ltd.), and then adding 4 weight parts of curing agent (PC2000, Guangzhou Libang Paint Ltd.) step by step, and then placing the container on a stirrer for stirring and mixing to obtain diffusion coating composition 2 of the present invention;

Coating the composition 2 to a PET substrate of 50 um (Shandong Fuwei Film Ltd.) to get the optical diffusion film 2 of the present invention, wherein the substrate coating process comprises unreeling the substrate with unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.).

Example 3

Preparation of the Optical Diffusion Film 3

Adding 36.5 weight parts of PS particles (which are commercially available) with diameter of 1-100 um and particle diameter C.V value of 20% (mean particle diameter being 35 um and standard deviation being 7 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 3 of the present invention;

Coating the composition 3 to a PET substrate of 50 um (Shandong Fuwei Film Ltd.) to get the optical diffusion film 3 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.).

Example 4

Preparation of the Optical Diffusion Film 4

Adding 36.5 weight parts of PMMA particles (which are commercially available) with diameter of 1-100 um and particle diameter C.V value of 25% (mean particle diameter being 40 um and standard deviation being 10 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 4 of the present invention;

Coating the composition 4 to a PET substrate of 100 um (DuPont Company) to get the optical diffusion film 4 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.).

Example 5

Preparation of the Optical Diffusion Film 5

Adding 36.5 weight parts of silicon dioxide particles (which are commercially available) with diameter of 1-100 um and particle diameter C.V value of 30% (mean particle diameter being 10 um and standard deviation being 3 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 5 of the present invention;

Coating the composition 5 to a PET substrate of 100 um (DuPont Company) to get the optical diffusion film 5 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.).

Example 6

Preparation of the Optical Diffusion Film 6

Adding 36.5 weight parts of PMMA particles (Advance chemical Ltd., Korea) with diameter of 1-100 um and particle diameter C.V value of 35% (mean particle diameter being 25 um and standard deviation being 8.75 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 6 of the present invention;

Coating the composition 6 to a PET substrate of 125 um (DuPont Company) to get the optical diffusion film 6 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.).

Example 7

Preparation of the Optical Diffusion Film 7

Adding 36.5 weight parts of PMMA particles (which are commercially available) with diameter of 1-100 um and particle diameter C.V value of 40% (mean particle diameter being 45 um and standard deviation being 18 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 7 of the present invention;

Coating the composition 7 to a PET substrate of 125 um (DuPont Company) to get the optical diffusion film 7 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.).

Example 8

Preparation of the Optical Diffusion Film 8

Adding 36.5 weight parts of silicon dioxide particles (which are commercially available) with diameter of 1-100 um and particle diameter C.V value of 45% (mean particle diameter being 40 um and standard deviation being 18 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 8 of the present invention;

Coating the composition 8 to a PET substrate of 188 um (Toray Industries Inc. Japan) to get the optical diffusion film 8 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.).

Example 9

Preparation of the Optical Diffusion Film 9

Adding 36.5 weight parts of particles (containing 10 weight parts of silicon dioxide particles and 26.5 weight parts of silicone resin particles which are commercially available) with diameter of 1-100 um and particle diameter C.V value of 50% (mean particle diameter being 35 um and standard deviation being 17.5 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 9 of the present invention;

Coating the composition 9 to a PET substrate of 188 um (Toray Industries Inc. Japan) to get the optical diffusion film 9 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.).

Example 10

Preparation of the Optical Diffusion Film 10

Adding 36.5 weight parts of particles (containing 12 weight parts of silicone resin particles and 24.5 weight parts of PMMA particles, which are commercially available) with diameter of 1-100 um and particle diameter C.V value of 55% (mean particle diameter being 50 um and standard deviation being 27.5 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 10 of the present invention;

Coating the composition 10 to a PET substrate of 188 um (Toray Industries Inc. Japan) to get the optical diffusion film 10 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.)

Example 11

Preparation of the Optical Diffusion Film 11

Adding 36.5 weight parts of particles (containing 15 weight parts of silicon dioxide particles and 21.5 weight parts of PS particles, which are commercially available) with diameter of 1-100 um and particle diameter C.V value of 60% (mean particle diameter being 18 um and standard deviation being 10.8 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stiller for stirring and mixing to obtain diffusion coating composition 11 of the present invention;

Coating the composition 11 to a PET substrate of 50 um (Shandong Fuwei Film Ltd.) to get the optical diffusion film 11 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.)

Example 12

Preparation of the Optical Diffusion Film 12

Adding 36.5 weight parts of particles (containing 20 weight parts of silicone resin particles and 16.5 weight parts of PS particles, which are commercially available) with diameter of 1-100 um and particle diameter C.V value of 70% (mean particle diameter being 15 um and standard deviation being 10.5 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 12 of the present invention;

Coating the composition 12 to a PET substrate of 38 um (Shandong Fuwei Film Ltd.) to get the optical diffusion film 12 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.)

Example 13

Preparation of the Optical Diffusion Film 13

Adding 36.5 weight parts of particles (containing 10 weight parts of silicon dioxide particles, 10 weight parts of silicone resin particles, and 16.5 weight parts of PS particles, which are commercially available) with diameter of 1-100 um and particle diameter C.V value of 80% (mean particle diameter being 20 um and standard deviation being 16 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 13 of the present invention;

Coating the composition 13 to a PET substrate of 38 um (Shandong Fuwei Film Ltd.) to get the optical diffusion film 13 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.)

Example 14

Preparation of the Optical Diffusion Film 14

Adding 36.5 weight parts of particles (containing 10 weight parts of silicone resin particles, 15 weight parts of PS particles and 11.5 weight parts of PMMA particles, which are commercially available) with diameter of 1-100 um and particle diameter C.V value of 90% (mean particle diameter being 40 um and standard deviation being 36 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 14 of the present invention;

Coating the composition 14 to a PET substrate of 100 um (DuPont Company) to get the optical diffusion film 14 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.)

Example 15

Preparation of the Optical Diffusion Film 15

Adding 36.5 weight parts of silicon dioxide particles (which are commercially available) with diameter of 1-100 um and particle diameter C.V value of 100% (mean particle diameter being 30 um and standard deviation being 30 um) into a container, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 15 of the present invention;

Coating the composition 15 to a PET substrate of 100 um (DuPont Company) to get the optical diffusion film 15 of the present invention, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.)

II. Compared Example

An optical diffusion film (0) with particle diameter C.V value of 5% (mean particle diameter being 30 um, and the standard deviation being 1.5 um) is prepared by a method the same as the above optical diffusion film (1-15). The specific preparation process of the optical diffusion film (0) comprises:

Adding 36.5 weight parts of silicon dioxide particles (which are commercially available) with diameter of 1-100 um and particle diameter C.V value of 5%, then adding 40 weight parts of polyester polyol (PC5000, Guangzhou Libang Paint Ltd.) and then adding 4 weight parts of curing agent (PC2000, Guangzhou Libang Paint Ltd.) step by step, and then placing the container on a stirrer for stirring and mixing to obtain diffusion coating composition 0 of the present invention;

Coating the composition 0 to a PET substrate of 38 um (Shandong Fuwei Film Ltd.) to get the optical diffusion film 0, wherein the substrate coating process comprises unreeling the substrate with a unreeling machine (full automatic film unreeling machine manufactured by Guangdong Shicheng Plastic Machinery Ltd.), then automatically feeding the composition, the composition, after coating on the substrate, is baking in the three-section drying oven (usual drying oven manufactured by Hangzhou Taoxing Printing Apparatus Ltd.) at 120° C., 100° C., 90° C. respectively, with a baking tunnel length of 10-30 m and the retention time of the film in the baking tunnel being 1-10 min, and finally, winding through a winding machine (full automatic film winding machine manufactured by Guangdong Shicheng Plastic Machinery Ltd.)

III. Test of the Optical Diffusion Film

Test 1

Test of adhesion: the adhesion of the optical diffusion films (0-15) is tested with a paint film scriber (QFH Paint Film Scriber, Kunshan Sannuo Instrument, the highest grade of scribing being 0 grade) in a dust-free workshop under temperature of 25±5° C. and humidity of 55%±5%.

Test 2

Test of hardness: the hardness of the above optical diffusion films (0-15) is tested with a pencil-style hardometer (QHQ-A pencil-style hardometer produced by Suzhou KLR instrument Ltd.,) in a dust-free workshop under temperature of 25±5° C. and humidity of 55%±5%. Along with the increase in hardness of the film, the film is easier to avoid the abrasion, the anti-abrasion property of the film increase.

TABLE 1

Property and test data of the optical diffusion films (0-15)

| film | diameter C.V value of the diffusion particles | Mean diameter of the diffusion particles/ um | Standard deviation of the diffusion particles/ um | Hardness of the film | Adhesion of the film |
|---|---|---|---|---|---|
| diffusion film 1 | 10% | 60 | 6 | ≥3H | 0 grade |
| diffusion film 2 | 15% | 55 | 8.25 | ≥3H | 0 grade |
| diffusion film 3 | 20% | 35 | 7 | ≥3H | 0 grade |
| diffusion film 4 | 25% | 40 | 10 | ≥3H | 0 grade |
| diffusion film 5 | 30% | 10 | 3 | ≥3H | 0 grade |
| diffusion film 6 | 35% | 25 | 8.75 | ≥3H | 0 grade |
| diffusion film 7 | 40% | 45 | 18 | ≥3H | 0 grade |
| diffusion film 8 | 45% | 40 | 18 | ≥3H | 0 grade |
| diffusion film 9 | 50% | 35 | 17.5 | ≥3H | 0 grade |
| diffusion film 10 | 55% | 50 | 27.5 | ≥3H | 0 grade |
| diffusion film 11 | 60% | 18 | 10.8 | ≥3H | 0 grade |
| diffusion film 12 | 70% | 15 | 10.5 | ≥3H | 0 grade |
| diffusion film 13 | 80% | 20 | 16 | ≥3H | 0 grade |
| diffusion film 14 | 90% | 40 | 36 | ≥3H | 0 grade |
| diffusion film 15 | 100% | 30 | 30 | ≥3H | 0 grade |
| diffusion film 0 | 5% | 30 | 1.5 | H | 0 grade |

Table 1 illustrates the performance and test data of the optical diffusion films (0-15). It shows that the hardness of the optical diffusion films (1-15) prepared from the diffusion particles with a diameter having variation coefficient of 10%-100% are all above 3H, larger than the hardness H of the optical diffusion film (0) prepared from diffusion particles with a diameter having variation coefficient of 5%, thereby showing better anti-abrasion property of the optical diffusion film in the invention. Meanwhile, the optical diffusion films in the present invention all have an adhesion of 0 grade, and therefore have good adhesiveness.

In conclusion the optical diffusion film in the present invention comprises the diffusion particles with the diameter variation coefficient of 10%-100%, which lead to decrease the abraded area of the optical diffusion film, solve the problem of the prior art that the diffusion particles with single or of narrow disperse diameter are abraded or detached in large area, when the optical diffusion thin film receives external force, and therefore this invention improves the anti-abrasion ability of the optical diffusion thin film.

The examples described above are merely the preferred embodiments but not intended to limit the scope of the claims. Any equivalent transformation or modification made in reference to the present invention falls within the protection scope of the patent.

The invention claimed is:

1. An anti-abrasion optical diffusion film comprising a substrate and a diffusion coating, the diffusion coating including a diffusion adhesive layer and diffusion particles, wherein the variation coefficient of the diameter of the diffusion particles is 60%-100%; the mean diameter of the diffusion particles is 10-60 um; and the diffusion particles are protruded out of the surface of the diffusion adhesive layer, or the diffusion particles are located inside the diffusion adhesive layer.

2. The anti-abrasion optical diffusion film of claim 1, wherein the variation coefficient of the diameter of the diffusion particles is 70%-100%.

3. The anti-abrasion optical diffusion film of claim 1, wherein the variation coefficient of the diameter of the diffusion particles is 80%-100%.

4. The anti-abrasion optical diffusion film of claim 1, wherein the variation coefficient of the diameter of the diffusion particles is 90%-100%.

5. The anti-abrasion optical diffusion film of claim 1, wherein the variation coefficient of the diameter of the diffusion particles is 80%-90%.

6. The anti-abrasion optical diffusion film of claim 1, wherein the diffusion coating, before coating to the substrate, is a composition which comprises 36.5 weight parts of diffusion particles, 40 weight parts of polyester polyol, and 4 weight parts of curing agent.

7. The anti-abrasion optical diffusion film of claim 1, wherein the diffusion particles are protruded out of the surface of the diffusion adhesive layer; the said diffusion particles contain 10 weight parts of silicone resin particles, 15 weight parts of PS particles and 11.5 weight parts of PMMA particles, with particle diameter C.V value of 90% (mean particle diameter being 40 um and standard deviation being 36 um).

8. The anti-abrasion optical diffusion film of claim 1, wherein the diffusion particles contain 10 weight parts of silicon dioxide particles, 10 weight parts of silicone resin particles, and 16.5 weight parts of PS particles, with particle diameter C.V value of 80% (mean particle diameter being 20 um and standard deviation being 16 um).

9. The anti-abrasion optical diffusion film of claim 1, wherein the diffusion particles comprise a material selected from the group consisting of the following materials: silicon compounds, silicone resin, polystyrene (PS), polymethyl methacrylate (PMMA), or the mixture of at least two thereof.

10. The anti-abrasion optical diffusion film of claim 1, wherein the substrate comprises polyethylene terephthalate (PET) polycarbonate or polystyrene.

11. The anti-abrasion optical diffusion film of claim 1, wherein the substrate comprises polyethylene glass or polymethyl methacrylate.

12. A method of preparing an anti-abrasion optical diffusion film of claim 1, comprising the following steps:
   sequentially adding diffusion particles, polyester polyol, and a curing agent into a container, and then placing the container on a stirrer for stirring and mixing to obtain a diffusion coating composition; and
   coating the composition to a substrate to get the optical diffusion film,
   wherein the substrate coating process comprises unreeling the substrate with a unreeling machine, then automatically feeding the composition, the composition, after coating on the substrate, is baked in the three-section drying oven at 120° C., 100° C., and 90° C., respectively, with a baking tunnel of 10-30 m and the retention time of the film in the baking tunnel being 1-10 minutes, and finally, winding through a winding machine.

13. An LCD device comprising a backlight module and a liquid crystal panel, wherein the backlight module comprises an anti-abrasion optical diffusion film of claim 1.

14. A lighting device comprising an anti-abrasion optical diffusion film of claim 1.

* * * * *

UNITED STATES PATENT AND TRADEMARK OFFICE
CERTIFICATE OF CORRECTION

| | | |
|---|---|---|
| PATENT NO. | : 9,004,709 B2 | Page 1 of 1 |
| APPLICATION NO. | : 13/578794 | |
| DATED | : April 14, 2015 | |
| INVENTOR(S) | : Yan Zhang and Yadong Jin | |

It is certified that error appears in the above-identified patent and that said Letters Patent is hereby corrected as shown below:

Title page, item (74), "Agent, Attorney or Firm," it should read --Weisun Rao, Ph.D., Greenberg Traurig, LLP-- and not "Weisun Pao, Greenberg Traurig LLP".

Signed and Sealed this
Eleventh Day of August, 2015

Michelle K. Lee
*Director of the United States Patent and Trademark Office*